United States Patent [19]
Memon

[11] Patent Number: 5,352,500
[45] Date of Patent: Oct. 4, 1994

[54] THERMOPLASTIC POLYMER COMPOSITIONS CONTAINING MELT-RHEOLOGY MODIFIERS

[75] Inventor: Nazir A. Memon, Fallsington, Pa.

[73] Assignee: Rohm and Haas Company, Philadelphia, Pa.

[21] Appl. No.: 14,054

[22] Filed: Feb. 5, 1993

Related U.S. Application Data

[60] Division of Ser. No. 389,656, Feb. 18, 1992, abandoned, which is a continuation-in-part of Ser. No. 153,170, Feb. 8, 1988, abandoned.

[51] Int. Cl.⁵ .................... B29D 22/00; B29D 23/00; B32B 1/08
[52] U.S. Cl. .................... 428/35.7; 428/36.5; 525/146; 525/148; 264/46.4; 293/102; 180/89.1
[58] Field of Search ............... 428/35.7, 36.5; 525/146, 148; 264/46.4; 293/102; 180/89.1

[56] References Cited

U.S. PATENT DOCUMENTS

| | | | |
|---|---|---|---|
| 3,591,659 | 7/1971 | Brinkmann et al. | 260/873 |
| 4,245,058 | 1/1981 | Liu | 525/148 |
| 4,257,937 | 3/1981 | Cohen et al. | 260/40 R |
| 4,263,415 | 4/1981 | Liu | 525/148 |
| 4,327,137 | 4/1982 | Sawa et al. | 428/35.7 |
| 4,544,706 | 10/1985 | Finch et al. | 525/146 |
| 4,587,298 | 5/1986 | Miller | 525/67 |
| 4,622,363 | 11/1986 | Eichenauer et al. | 525/67 |
| 4,774,289 | 9/1988 | Kress et al. | 525/146 |
| 4,883,841 | 11/1989 | Riew et al. | 525/148 |

FOREIGN PATENT DOCUMENTS 0155989 2/1985 European Pat. Off. .

*Primary Examiner*—Susan W. Berman
*Attorney, Agent, or Firm*—Roger K. Graham

[57] ABSTRACT

Acrylic polymers having a minimum molecular weight of about 500,000, and preferably of about 1,500,000, are blended at levels of from 1 to 25% with thermoplastic resins to improve the melt rheology of the thermoplastic resins and facilitate blow molding, thermoforming, extrusion and similar processes.

8 Claims, No Drawings

THERMOPLASTIC POLYMER COMPOSITIONS CONTAINING MELT-RHEOLOGY MODIFIERS

This is a division application of U.S. application Ser. No. 389,656, filed Feb. 18, 1992, now abandoned which is a continuation-in-part application of U.S. application Ser. No. 153,170 filed Feb. 8, 1988, now abandoned.

This invention relates to melt-rheology modifiers for thermoplastic polymers, and more particularly to high-molecular-weight acrylic polymers as melt-rheology modifiers, and to the thermoplastic polymers having modified melt-rheology properties.

BACKGROUND OF THE INVENTION

The compositions of the present invention are particularly well suited to blow-molding processes, by which thin-walled articles such as bottles are formed from a partially shaped, usually hollow polymer article known as a parison. The parison is formed by well-known processes such as extrusion or injection molding; it is then typically placed in a final mold, expanded by gas pressure to conform to the shape of the final mold and cooled to fix its shape. Variations of this process are well known in the art, and it may be used with many thermoplastic polymers. Such polymers that have been used by others to form blow-molded articles include poly(vinyl chloride), or PVC, poly(ethylene terephthalate), or PET, and polypropylene.

Desirably, such polymers balance melt-rheology properties such as flow and sag: the polymer must flow readily enough to be extruded, injection molded or otherwise formed into the parison; it must be sufficiently elastic and thermoplastic to fill the final mold readily under air pressure and heat, and without melt fracture or other surface distortion; yet it must be sufficiently resistant to flow or sag while cooling that the shape of the finished article is retained.

Further, if the polymer may be crystallized, the various processing, blending, and forming operations to which it is subjected must not accelerate crystallization to the point that blow-molding properties are degraded.

This combination of properties is difficult to find in unmodified polymers. Poly(vinyl chloride) may be easily modified with polymers that act as processing aids, to make a polymer that is tractable in blow-molding applications, but other polymers have been more difficult to modify satisfactorily. Condensation polymers such as polycarbonates and polyamides and relatively low-molecular weight polymers such as polyethylene terephthalate of molecular weights in the range below about 20,000 have been difficult to modify for blow molding, and polycarbonate resins have proved especially difficult.

One approach that has been used to improve the blow-molding properties of polycarbonate resins has been to introduce chain branching into the polycarbonate molecule, as taught by Hedges et al. in U.S. Pat. No. 4,415,723. Another has-been to copolymerize the polycarbonate with a polyester, as taught by Belfoure in European Patent Application 155,989. Neither of these approaches has been entirely successful; particular properties are improved, but the balance of properties important to blow molding is not sufficiently improved.

Branching or increasing the molecular weight of the polymer have been applied to other polymers used in blow molding. Branching is taught for poly(ethylene terephthalate) by Edelman et al. in U.S. Pat. No. 4,161,579, but these approaches with polyesters either require careful control of melt reactivity or cause processing times to be extended. Polyamides having reactive amine end groups may De reacted with groups on an additive, to tie together the polyamide molecules and effectively raise the molecular weight, as is taught by Owens et al. in U.S. Pat. No. 3,668,274 or Leslie et al. in U.S. Pat. No. 4,145,466. This method requires careful control of stoichiometry, and may not be suited to less reactive polymers.

The rheology of polycarbonates has been controlled by additives, such as the selectively hydrogenated block copolymers of vinyl monomers and olefins taught by Bussink et al. in British Patent No. 2,004,284, triazines taught as softeners by Mark et al. in U.S. Pat. No. 4,159,974, blends with styrene-maleic anhydride copolymers and styrene-acrylonitrile copolymers taught by Henton in U.S. Pat. No. 4,218,544 and the like.

Acrylic and methacrylic copolymers have been added to polycarbonate resins or polyester-polycarbonate blends as impact modifiers; these copolymers typically possess a core-shell (multi-stage) morphology, and they have relatively low molecular weights, generally below about 300,000. Such copolymers are taught in, for example, Liu, U.S. Pat. No. 4,245,058, Cohen et al., U.S. Pat. No. 4,257,937, Fromuth et al., 4,264,487 and Brinkmann, U.S. Pat. No. 3,591,659. Such impact-modifying polymers preferably contain a core (first stage) of rubbery poly(alkyl acrylate) polymer or copolymer which is optionally crosslinked and/or graftlinked, and a thermoplastic hard shell (outer stage) preferably of poly(methyl methacrylate) polymer or copolymer, as taught by Farnham et al., U.S. Pat. No. 4,096,202.

Other impact modifying polymers are methacrylate-butadiene-styrene resins, which are multi-stage polymers having a butadiene polymer or copolymer, optionally containing vinylaromatics, as for examples styrenics, (meth)acrylate esters, or (meth)acrylonitrile, at levels below 30% and optional crosslinking, as a first stage. One or more thermoplastic methyl methacrylate polymer stages containing styrene, lower alkyl (meth)acrylates and/or (meth)acrylonitrile and optionally other monovinyl, monovinylidene, polyvinyl and/or poly vinylidene components are polymerized onto the first stage. Such modifiers are useful for impact-property modification of polycarbonates and polyesters, and are taught by Nakamura et al., U.S. Pat. No. 3,864,428 and Fromuth et al., U.S. Pat. No. 4,180,494.

Such staged polymers are preferably made by emulsion polymerization and isolated by any of several techniques known to those skilled in the art, including coagulation, spray drying or other evaporative techniques such as extruder coagulation with dewatering and pelletization as taught by Bortnick in U.S. Pat. No. 3,751,527. These impact-property-modifying polymers may be stabilized with additives during isolation and may be further treated, as by partial fusing or pelletization, for ease of handling or blending. Blends of poly(methyl methacrylate) with poly(ethylene terephthalate) are also taught for blow molding of bottles by Japanese Kokai 55-90921, 57-18221, and 57-6727; these teachings would not encourage one to depart from the relatively low molecular weights disclosed for the impact modifiers.

High-molecular-weight polymers have been added to various polymers, as for instance the Boutillier et al. addition of high-molecular-weight styrene to thermoplastic polystyrene as a foaming-process aid (U.S. Pat.

No. 3.903,023). Eichenauer et al., in U.S. Pat. No. 4,622,363, disclose the use of high-molecular-weight copolymers of styrene with a minor amount of a nitrile or (meth)acrylic ester, in combination with low-molecular-weight copolymers of styrene with nitrile or (meth)acrylic ester and graft polymers of styrene-methyl methacrylate on a rubbery polymer, for the purpose of raising the softening temperature of polycarbonate resins.

An object of the present invention is to provide a process for improving the rheological properties of thermoplastic polymer melts, and particularly the blow-molding properties of such melts. A further object is to provide a polymeric additive which improves these rheological properties. Additional objects will be apparent from the disclosure below.

THE INVENTION

I have discovered high-molecular-weight homopolymers or copolymers of acrylic monomers having minimum weight-average molecular weights of 500,000, and preferably of about 1,500,000, which impart a particularly advantageous balance of melt-rheology properties for various uses, including blow molding, making extruded articles and thermoformable sheet, and making thermoformed articles therefrom, to certain thermoplastic polymers and copolymers; preferred are polycarbonate resins, polyester resins and blends of polycarbonate with polyester.

DESCRIPTION OF THE INVENTION

The melt-rheology-modifying (MRM) polymers of the present invention are prepared by free-radical polymerization of acrylic monomers to minimum molecular weights of about 500,000, and preferably of about 1,500,000. At least 50%, and more preferably at least 70%, by weight, of the polymers comprises polymer units from an acrylic monomer having the formula

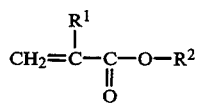

where $R^1$ is H or $CH_3$ and $R^2$ is selected from H, alkyl, substituted alkyl, cycloalkyl, aryl, aralkyl and alkaryl, and is preferably an alkyl group containing 1 to 8 carbons. Especially preferred for $R^2$ are methyl, ethyl and n-butyl, and the especially preferred polymers of the present invention are terpolymers of at least 70% by weight methyl methacrylate, 0–20% by weight ethyl or butyl acrylate and 0–30% by weight butyl methacrylate. As used herein the term (meth) acrylate refers to the above formula where $R^1$ is either H or $CH_3$.

As a minor component of the MRM polymers, units from other copolymerizable vinyl monomers may be selected by those skilled in the art. Included among such copolymerizable vinyl monomers are those bearing functional groups, as for example the carboxylic acid groups found in (meth)acrylic acid.

The MRM polymers of the present invention may be prepared by any known polymerization techniques, including bulk, solution, emulsion or suspension polymerization. Preferred is conventional emulsion polymerization, using thermal, redox or other known initiation, batch feed or gradual feed, single or multiple staged polymerization, seeded polymerization, and similar variations of this technique which will be apparent to those skilled in the art. The emulsifier may be selected from among those known to be useful in polymerizations; preferred are those which do not degrade the color or stability of the polymer or of the resin to which it is added. Typical of emulsifiers for emulsion polymerization are alkali metal and ammonium salts of fatty carboxylic acids, such as sodium oleate or sodium stearate; salts of disproportionated rosin acids; ethoxylated and/or propoxylated alkyl phenols, such as dodecyl phenol with 1–100 ethylene oxide units; salts of aliphatic or aromatic sulfates such as sodium lauryl sulfate; salts of aliphatic or aromatic sulfonates, such as sodium dodecylbenzene sulfonate; sodium or potassium or ammonium dialkylsulfosuccinates; disodium salts of mono- or dialkylated diphenylether disulfonates; $C_{12}$–$C_{18}$ alkylsulfonates, sulfates, sulfonates, phosphates, or phosphonates based on alkylene oxide adducts of alkylated phenols, such as sodium alkylphenol-(ethylene oxide)1–100 phosphate; and many others known to the art. Combinations of emulsifiers may be employed. Preferred are those with sufficient thermal stability that their residues in the isolated acrylic additive can be processed into the matrix resin without deleterious effects on color or stability; such emulsifiers include alkyl, aryl aralkyl, and alkaryl sulfonates, and alkyl, aryl aralkyl, and alkaryl phosphonates. Such an emulsion polymerization allows the preparation of polymer particles having small size, narrow size distribution and high molecular weight, quickly and at high conversions, with minimum residual monomers. One process by which polymers of the preferred molecular weights may be made is taught by Kotani et al. in U.S. Pat. No. 4,201,848, and other processes are known to those skilled in the art. The polymer may be easily isolated from the reaction mixture using known techniques.

The minimum weight-average molecular weight ($M_w$) of the FIRM polymers of the present invention, as measured by gel permeation chromatography (GPC) techniques, is preferably about 500,000, more preferably about 1,500,000, and still more preferably about 3,000,000 ($3 \times 10^6$). Below these values the contribution of the polymer to the blow-molding properties of the resin incorporating it is small, although benefits may be recognized from using lower-molecular-weight MRM polymers, as for example those with $M_w$ of about 400,000. Difficulties with preparing extremely high-molecular-weight polymers create a practical upper limit of about ten million for the preferred polymer, although higher molecular weights are contemplated within the scope of the present invention. The preferred MRM polymers are linear or branched, but they are not crosslinked; that is, they are soluble in organic solvents such as tetrahydrofuran, toluene, ethylene dichloride and the like. Within the broader aspect of the invention, crosslinked, and especially lightly crosslinked, polymers are also contemplated. Such crosslinking may be introduced by the incorporation of units from polyethylenically unsaturated monomers into the MRM polymer, preferably at levels up to about 5%, and more preferably-from about 0.01 to about 0.5%, by weight based on the total MRM polymer weight, or it may be introduced by other techniques known to those skilled in the art, as for example thermal crosslinking or various post-crosslinking techniques.

The MRM polymer of the present invention may be isolated from the emulsion in which it is formed by any of several methods, including coagulation, evaporation, spray drying, or devolatilizing in an extruder followed by pelletization. Preferred are spray drying and coagulation.

The matrix resins into which the MRM polymer of the present invention is incorporated include polycarbonates; polyesters including poly(alkylene terephthalates); poly(aromatic ketones) such as polyether ketone, polyether ether ketone, polyether ketone ketone, polyketone; poly(phenylene ethers); poly(phenylene sulfides); phenoxy resins; polysulfones such as poly(ether sulfone), poly(aryl sulfone), polysulfone; poly(ether imides); poly(ether imide esters); copoly(ether imide esters); poly(ester carbonates); polyarylates such as poly(bisphenol A isophthalate); polyimides such as poly(glutarimides); aromatic polyimides; polyacetals; poly(styrene) including crystal poly(styrene) and high impact poly(styrene); polymers of vinyl toluene or paramethyl styrene; copolymers of styrene or alkyl substituted styrene with acrylonitrile or maleic anhydride; polyamides including crystalline and amorphous polyamides; acrylate-styrene-acrylonitrile resins; acrylonitrile-butadiene-styrene resins; poly(amide imides); nitrile resins; poly(methyl pentene); olefin modified styrene-acrylonitrile; styrene-butadiene resins; acrylonitrile-chlorinated polyethylene-styrene resins; thermoplastic elastomers such as poly(ether esters), poly(ether amides), poly(styrene butadiene styrenes) and poly(styrene ethylene-butylene styrenes); and copolymers and blends of the above. Those matrix resins specifically listed above shall be indicated herein by the term "thermoplastic engineering resins."

Using methods known to those skilled in the art, the MRM polymer of the present invention may be incorporated into the matrix resin at from about 1% to about 25% of the total weight of resin plus polymer. Higher levels may be used within the scope of the present invention, but may deleteriously affect the balance of other physical properties, such as the heat distortion temperature, of the resin in specific applications. A more preferred range is from about 1 to about 10%, and still more preferred is from about 5 to about 10%. The MRM polymer may, for example, be incorporated into the resin by blending the MRM polymer, as a dry powder or pellets, with a dry powder or pellets of the matrix resin. Alternatively, if the matrix resin and the MRM polymer have been separately prepared as emulsions, the emulsions may be mixed and isolated as an intimate mixture by conventional methods such as coagulation or spray drying, or as yet another alternative, the emulsions may be isolated separately and sequentially in the same equipment, this process being termed "staged coagulation." As a less preferred method, the monomers used to prepare the MRM polymer may be polymerized in the presence of the matrix polymer, but the polymerization conditions must be carefully controlled, or the molecular weight of the resulting polymer will be too low to be fully effective.

Other additives may be incorporated into the matrix resin prior or subsequent to incorporation of the polymer of the present invention, or they may be incorporated simultaneously, as by coagulating or spray drying mixed emulsions of the MRM polymer and the additives, and incorporating the resulting material into the matrix resin. Such procedures are conventional, and will be readily apparent to those skilled in the art.

These additives may include other polymers useful as impact modifiers, lubricants, flame retardants, blowing agents, antioxidants, light stabilizers, heat stabilizers, and the like. The blends may also contain fillers such as calcium carbonate, reinforcing agents such as coupled mica, fibers such as glass fibers, and the like.

Blowing agents include chemical blowing agents, such as azobiscarbonamides, added to or blended with the molten polymeric mixture, followed by processing of the molten blend under conditions sufficient to decompose the chemical blowing agent prior to exit of the molten polymer from the processing apparatus. Blowing agents also include gaseous blowing agents, such as nitrogen, added to the molten polymer blend prior to exit of the molten polymer from the processing apparatus. Such chemical or gaseous blowing agents will produce a foamed extruded, blow-molded, thermoformable or thermoformed article, depending on the fabrication process chosen. By "foamed" is meant an internal foamed structure with cell sizes sufficient to reduce weight substantially, but small and uniform enough to allow continuous support for load-bearing from the polymer surrounding the cells.

A significant use of the resins which incorporate the MRM polymer of the invention is in the preparation of useful articles by extrusion blow molding, but the enhanced melt strength imparted by the MRM polymers will also be advantageous in preparing useful articles by processes such as injection blow molding, thermoforming and stamping processes on polymer sheet, molding of foamed polymers, extrusion of profile, such as foamed profile, sheet, rods, or tubes, and the like, performed upon resins containing the MRM polymers of this invention. The resins which incorporate the MRM polymer will also be advantageous in other applications where high melt strength is a desirable property. Other uses will be readily apparent to those skilled in the art.

Useful articles which may be made from the resins which incorporate the MRM polymer of the present invention include items for automotive use, such as bumpers, spoiler panels, dashboard panels, rear window panels, external air spoilers, seat backs, truck bed liners, wind deflectors, motorcycle fairings and skirtings and the like. Further uses may include toys, such as tricycles, surfboards, exercise equipment, television housings, other equipment housings, such as typewriter cases, and the like. Still further uses include containers such as bottles, tanks for organic or inorganic liquids, and the like. The formed materials may be useful in buildings, such as decorative or tough protective panels, thermoformed panels, seating construction, pipe, profiled shapes for window and door construction and the like. Foamed articles such as sheet, rods, tubes, and especially profile will be useful where the shape retention and load-bearing properties of the engineering resin are maintained but with a lighter weight construction; such uses will include panels, equipment housing, window and door frames, toys, automotive uses, athletic equipment, and the like. Many other uses for such tough, heat resistant, readily blow-molded, thermoformed or otherwise processed plastics having high melt strength will be readily apparent to those skilled in the art.

All percentages and ratios given herein are by weight, unless otherwise stated, and all reagents are of good commercial quality unless otherwise stated.

Physical-property tests performed on the matrix polymers containing the MRM polymers of the present invention include melt viscosity, melt creep rate, extrusion sag time, modulus and impact resistance. Melt viscosity was determined for the samples using a Rheometrics "Dynamic Spectrometer" in the parallel-plate mode. A sample with a radius of 12.5 mm and approximately 2 mm thick was placed between the plates, and dynamic torsional shear was applied to the sample at a rate of 100 radians/sec as the sample temperature was raised. The temperature at which the sample viscosity at that shear rate reached 20,000 poise was taken as the "process temperature". The sample was then held at the process temperature and the shear rate was reduced to 1 radian/second. The melt viscosity was measured at the lower shear rate, and the dynamic melt-strength parameter, R*, was determined by dividing the measured melt viscosity at the lower shear rate by the 20,000-poise value obtained at the higher shear rate.

Melt creep rate (MCR) was measured using a Rheometrics "Stress Rheometer" A sample with a radius of 12.5 mm and a thickness of 1 mm was placed between the parallel plates of the instrument. A constant shear load of $3 \times 10^4$ dynes/cm$^2$ applied to the sample at the process temperature determined above, and the angle, in radians, through which the loaded plate moved with respect to the fixed plate was measured. The strain was calculated by multiplying the angle by the radius of the sample disk and dividing the sample thickeners. The MCR was then determined by dividing the strain by the time over which the strain was measured. MCR units are sec$^{-1}$.

Extrusion sag time was determined by horizontally extruding a strand of polymer from a Killion 25-mm extruder operating at a rate of 60 rpm, through the specified die at the specified temperature. The time for the strand to sag to a point 1.00 meter below the die was recorded in seconds.

Tensile modulus was measured according to ASTM Standard Method D-638. Impact resistance was measured using a notched Izod impact sample according to ASTM Standard Method No. D-256. Both number-average and weight-average molecular weights ($M_n$ and $M_w$) were determined by gel-permeation chromatography, using a poly(methyl methacrylate) reference. The following abbreviations are used to indicate monomer components of the polymers in the following examples:

MMA - Methyl Methacrylate
EA - Ethyl Acrylate
BA - n-Butyl Acrylate
BMA - n-Butyl Methacrylate In the examples and elsewhere in the specification and claims, all ratios and percentages are by weight unless otherwise indicated, and all reagents are of good commercial quality unless otherwise indicated. In all emulsion preparations, the water used is deionized water.

The following examples are intended to illustrate the invention.

EXAMPLE 1

This example illustrates the preparation of a high-molecular-weight acrylic MRM polymer of the present invention having an overall composition MMA/EA/BMA=79.8/13.2/7.0, and molecular weights of $M_w = 4 \times 10^6$ and $M_n = 1 \times 10^6$.

To a 3-neck, 5-liter flask equipped with a stirrer, reflux condenser and nitrogen sweep was added 455 g water, 0.16 g glacial acetic acid, 0.78 g sodium chloride and 4 g of emulsifier; the emulsifier was rinsed into the vessel with an additional 35 ml of water. The contents of the vessel were adjusted to, and maintained at, 30° C. while 100.4 g methyl methacrylate, 63.8 g ethyl acrylate and 18.2 g n-butyl methacrylate were added; the monomers were rinsed into the vessel with an additional 10 ml of water. A mixture of 0.231 g sodium formaldehyde sulfoxylate in 25 ml water was added to the vessel, followed by 0.33 g t-butyl hydroperoxide (70% active) as an initiator. Polymerization was evidenced by a rise in temperature of the vessel contents, beginning about two minutes after the initiation was added, with a peak temperature of about 65°–70° C. The vessel contents were then cooled to 50° C. by adding 130 ml water. An additional 12.2 g emulsifier were rinsed into the reactor with 5 ml water, and 481.1 g methyl methacrylate, 32.8 g ethyl acrylate and 32.8 g n-butyl methacrylate were added and rinsed into the vessel with 20 ml water. The temperature was adjusted to 35° C. and the nitrogen sweep was discontinued. A mixture of 0,219 g sodium formaldehyde sulfoxylate in 20 ml water was added, followed by 0.39 g t-butyl hydroperoxide. After the exotherm peak, the vessel was cooled to room temperature, and a latex having 50.5% solids was removed from the vessel.

EXAMPLES 2–7

These examples show the modification of blow-molding-related physical properties of polymer blends that simulate commercial blow-molding resins.

The latex from Example 1 was isolated by spray drying, and melt blended at various levels, in a 25 mm Killion extruder at 249° C., into a stabilized, 43/57 blend of poly(butylene terephthalate) (PBT) having an intrinsic viscosity, measured in 60/40 phenol/tetrachloroethane, of 1.1 dl/g at 25° C., with branched aromatic polycarbonate as described in U.S. Pat. No. 4,001,184, having an intrinsic viscosity, measured in methylene chloride, of 0.5 dl/g at 25° C., and marketed by General Electric Company as Lexan 151 (PC), containing 18% (based on the PBT +PC weight) core-shell impact modifier having a core (77.5 parts) polymerized from 71 parts butadiene, 3 parts styrene, 4 parts methyl methacrylate and 1 part divinylbenzene; a second stage polymerized from 11 parts styrene; and a shell polymerized from 11 parts methyl methacrylate and 0.1 parts 1.3-butylene glycol dimethacrylate. Impact resistance, modulus, extrusion sag time, melt creep rate and the dynamic melt-strength parameter, R*, described above, were determined for these blends, and are shown in Table I as Examples 2–4.

The isolated latex was similarly blended at various levels into a stabilized, 75/25 blend of co-polyester-polycarbonate made according to Belfoure, European Patent Application 155,989 with stabilized poly(ethylene terephthalate) containing 18% (based on the co-polyester-polycarbonate weight) core-shell impact modifier having core of rubbery crosslinked poly(n-butyl acrylate), and graftlinked thereto, an outer, rigid shell of methyl methacrylate. Similar physical property measurements were made for these blends and are shown in Table I as Examples 5–7; extrusion sag time was determined using a barrel temperature of 249° C. and a 3.18 mm die.

TABLE I

| Example | MRM Polymer of Example 1 (wt. %) | Notched Izod (joules/cm) | Tensile Modulus (kPa) | R* | MCR sec-1 | Extrusion Sag Time sec. |
|---|---|---|---|---|---|---|
| 2 | 0 | 7.74 | 2210 | 7.8 | 0.091 | 20 |
| 3 | 3 | 8.01 | 2217 | 10.0 | 0.037 | 29 |
| 4 | 5 | 7.90 | 2204 | 11.1 | 0.029 | 34 |
| 5 | 0 | 5.71 | 1188 | 4.9 | 0.13 | 27 |
| 6 | 3 | 6.30 | 1181 | 5.4 | 0.09 | 40 |
| 7 | 5 | 5.82 | 1167 | 5.8 | 0.06 | 44 |

As may be seen from the above table, the physical properties, such as the notched Izod impact values and the tensile modulus, of the resins were unchanged by the addition of the MRM polymer, but the melt-rheology properties, such as the melt creep rate, R* and extrusion sag time, were significantly improved.

EXAMPLE 8

This example illustrates preparation of blow-molding parisons from the blends of Examples 2 and 4 above, and the higher melt strength obtainable with the blends containing the MRM polymer of the present invention. The blow-molding equipment used in this example was a 3.2 kg Sterling blow-molding machine with a 3.2-kg-capacity accumulator head, and controlled by a Maco 8000 process control system. The accumulator was fed with an 8.9 cm extruder equipped with a single Sterling barrier-type screw. The parison die was a 35.5-cm-diameter, annular die with a programmed gap width set to produce nominal 2.5-mm parison wall thickness. The blended polymer was pelletized, the pellets were fed to the single-screw extruder and extruded into the accumulator; when the accumulator was full, the polymer melt at 249° C. was forced through the die to form a 122-cm-long parison. The polymer of Example 4 produced a short parison, about half the length of that from an equal weight of the control polymer of Example 2, indicative of thicker walls caused by a higher melt strength for polymer containing the MRM polymer. To obtain a parison of comparable length and wall thickness, the die gap for the polymer of Example 4 was decreased. Parison hang time for the similar-sized parisons was taken as the time for the bottom of the parison to sag to the floor, 1.0 meters below the bottom of the parison as formed. The hang time for the parison made from the control polymer of Example 2 was 2.5 seconds, and the parison sagged to the floor, with considerable narrowing at the top, while the hang time for the parison made from the resin of Example 4 was 6.2 seconds at the same temperature and 3.7 seconds at 260° C.; both of the parisons made from the resin of Example 4 broke away near the die, after essentially no narrowing at the top, and fell to the floor.

EXAMPLES 9-18

The following examples illustrate that high-molecular-weight acrylic MRM polymers of the present invention having various compositions are effective in improving the blow-molding-related theological property of extrusion sag time when blended into the resin of Examples 2-4 at a level of 5%. The MRM polymers of the present invention used in these examples have the compositions and molecular weights indicated in Table II. The processes by which they were prepared are as follows: Process I is the process of Example 1, Process II indicates a multi-step, thermal emulsion polymerization, and Process III indicates a two-stage, redox emulsion polymerization. Extrusion sag time was determined as described above, using an extruder speed of 60 rpm, a barrel temperature of 249° C. and a 1.59-mm die. The result are shown in Table II below:

TABLE II

| Example | Composition (MMA/EA/BA/BMA) (Ratio) | Prepared by Process | $M_w$ (×10$^6$) | Extrusion Sag Time (sec) | R* |
|---|---|---|---|---|---|
| 9 | 99/1/0/0 | III | 2.7 | 15.3 | 9.6 |
| 10 | 99/1/0/0 | II | 2.7 | 10.7 | 9.9 |
| 11 | 99/1/0/0 | III | 1.6 | 11.5 | 10.3 |
| 12 | 79/13/0/3 | I | 4.1 | 12.6 | 9.7 |
| 13 | 79/13/0/3 | I | 7.5 | 17.7 | 9.8 |
| 14 | 75/1/0/24 | III | 2.9 | 14.5 | 9.6 |
| 15 | 75/1/0/24 | II | 3.3 | 14.5 | 10.3 |
| 16 | 100/0/0/0 | | 3.1 | 14.2 | 9.8 |
| 17 | 86/0/7/7 | I | 2.5 | 10.9 | 10.6 |
| 18 | Matrix Resin | — | — | 7.6 | 7.0 |

EXAMPLES 19-23

In the following examples high-molecular-weight methyl methacrylate/ethyl acrylate/butyl methacrylate MRM polymers of the present invention were blended at a level of 5% with the resin of Examples 2-4. The composition of the MRM polymers, weight-average molecular weight, rheological parameter R*, melt creep rate (MCR) and extrusion sag time at a 249° C. barrel temperature using a 1.59-ram die are shown in Table III, below:

TABLE III

| Example | Compositions (MMA/EA/BMA (Ratio) | $M_w$ (×10$^6$) | R* | MCR (sec-1) | Extrusion Sag Time (sec) |
|---|---|---|---|---|---|
| 19 | 75/1/24 | 4.1 | 9.7 | 0.04 | 12.3 |
| 20 | 73/3/24 | 4.5 | 9.5 | 0.06 | 12.8 |
| 21 | 89/1/10 | 3.5 | 10.1 | 0.06 | 11.5 |
| 22 | 87/3/10 | 3.2 | 10.6 | 0.05 | 11.6 |
| 23 | 79.8/7/13.2 | 4.2 | 10.2 | 0.08 | 12.1 |

EXAMPLES 24-27

In the following examples, high-molecular-weight methyl methacrylate/butyl acrylate/butyl methacrylate polymers of the present invention were blended at a level of 5% with the resin of Examples 2-4. The blends were tested as in Examples 19-23, and the results are shown in Table IV, below:

TABLE IV

| Example | Compositions (MMA/EA/BMA Ratio) | $M_w$ (×10$^6$) | R* | MCR (sec-1) | Extrusion Sag Time |
|---|---|---|---|---|---|
| 24 | 74.7/1.3/24 | 4.7 | 10.5 | 0.04 | 12.8 |
| 25 | 72.2/3.8/24 | 4.6 | 10.3 | 0.05 | 12.7 |
| 26 | 88.7/1.3/10 | 3.2 | 10.6 | 0.07 | 11.7 |
| 27 | 86.2/3.8/10 | 3.2 | 10.4 | 0.07 | 11.3 |

EXAMPLES 28-36

These examples illustrate the effect of functional monomers, when incorporated into the MRM polymers of the present invention, upon physical properties of blends of the polymers with the resin of Examples 2-4. Functional monomers used include maleic anhydride (MAH), methacrylic acid (MAA), diallyl maleate (DALM) and butylene glycol dimethacrylate (BGDMA), and the polymers were prepared using a two-stage redox emulsion polymerization. The compositions of the MRM polymers were as follows:

MRM Polymer A
MMA/BMA/EA/MAH=70/24/1/5

MRM Polymer B
MMA/BMA/EA/DALM=72.8/24/3/0.2

MRM Polymer C
MMA/BMA/EA/DALM=80.9/17/2/0.1

MRM Polymer D
MMA/BMA/EA/DALM=88.8/10/1/0.2

MRM Polymer E
MMA/BA/DALM//MMA/BGD-MA=78.24/1.6/1.6//f9.8/0.2

Properties measured were extrusion sag time, the theological parameter (R*) and melt creep rate (MCR). The extrusion sag time was determined as described above, using an extruder speed of 60 rpm, a barrel temperature of 249° C. and a 1.59-ram die. The results are shown in Table V.

TABLE V

| Example | MRM Polymer, Level (%) | MRM Polymer $M_w$ ($\times 10^6$) | Extrusion Sag Time (sec) | R* | MCR (sec-1) |
| --- | --- | --- | --- | --- | --- |
| 28 | 0 | — | 7.3 | 6.7 | — |
| 29 | A, 5% | 0.73 | 9.6 | 9.9 | — |
| 30 | 0 | — | 7.8 | 7.1 | 0.090 |
| 31 | B, 5% | Note | 11.0 | 10.0 | 0.040 |
| 32 | C, 5% | 3.7 | 11.5 | 10.3 | 0.034 |
| 33 | D, 5% | Note | 11.5 | 10.0 | 0.036 |
| 34 | 0 | — | — | 7.1 | 0.090 |
| 35 | E, 3% | Note | — | 8.5 | 0.039 |
| 36 | E, 5% | Note | — | 12.7 | 0.030 |

Note:
The molecular weight for these polymers could not be determined, because they were insoluble in tetrahydrofuran.

EXAMPLES 37-39

These examples illustrate the improvement of extrusion sag time as the level of an MRM polymer of the present invention is increased in a branched polycarbonate (PC). The MRM polymer was prepared using a two-stage, redox emulsion polymerization and has a molecular weight of $4.6 \times 10^6$ and the composition 72.16% MMA/24% BMA/3.84% BA, and the branched polycarbonate is that described in Examples 2-4 as a component of the blended polycarbonate-polyester resin. The extrusion sag time was determined as described above, using an extruder speed of 60 rpm, a barrel temperature of 266° C. and a 3.18-mm die. The results are shown in Table VI, below.

TABLE VI

| Example | Branched PC (%) | Acrylic Polymer (%) | Extrusion Sag Time (sec) |
| --- | --- | --- | --- |
| 37 | 100.0 | 0.0 | 10.5 |
| 38 | 95.0 | 5.0 | 15.0 |
| 39 | 90.0 | 10.0 | 20.1 |

EXAMPLES 40-42

These examples illustrate that inclusion of a conventional impact modifier into a branched polycarbonate fails to improve its extrusion sag time, and in fact decreases it slightly, while addition of the high-molecular-weight acrylic MRM polymer of the present invention substantially improves the extrusion sag time. The branched polycarbonate (PC) is that described in Examples 2-4 as a component of the blended polycarbonate-polyester resin. The MRM polymer was that of Example 1 and had molecular weight of $4.1 \times 10^6$, and the impact modifier was the core-shell impact modifier described in Examples 5-7. The extrusion sag time was measured as described above, using an extruder speed of 60 rpm, a barrel temperature of 266° C. and a 1.59-mm die. The results are shown in Table VII.

TABLE VII

| Example | Branched PC (%) | Impact Modifier (%) | Acrylic Polymer (%) | Extrusion Sag Time (sec) |
| --- | --- | --- | --- | --- |
| 40 | 100.0 | 0.0 | 0.0 | 8.4 |
| 41 | 90.0 | 10.0 | 0.0 | 8.0 |
| 42 | 85.0 | 10.0 | 5.0 | 13.5 |

EXAMPLES 43-50

These examples show the improvement of the blow-molding-related property, extrusion sag time, as the level of an MRM polymer of the present invention is increased in a resin similar to that of Examples 2-4. In these examples the amount of impact modifier of Examples 2-4 was held constant, and the high-molecular-weight acrylic MRM polymer, made using a two-stage, redox emulsion polymerization and having a molecular weight of $4.3 \times 10^6$ and a composition of 72.16% MMA/3.84% EA/24% BMA, replaced a portion of the polycarbonate-poly (butylene terephthalate) (PC-PBT) in the blend, to the extent indicated below in Table VIII. Extrusion sag time was measured as described above, using an extruder speed of 60 rpm, a barrel temperature of 24 9° C. and a 1.59-ram die.

TABLE VIII

| Example | PC-PBT (%) | Impact Modifier (%) | Acrylic Polymer (%) | Extrusion Sag Time (sec) |
| --- | --- | --- | --- | --- |
| 43 | 85.0 | 15.0 | 0.0 | 7.8 |
| 44 | 84.0 | 15.0 | 1.0 | 9.9 |
| 45 | 82.0 | 15.0 | 3.0 | 12.0 |
| 46 | 80.0 | 15.0 | 5.0 | 14.3 |
| 47 | 78.0 | 15.0 | 7.0 | 15.3 |
| 48 | 75.0 | 15.0 | 10.0 | 17.2 |
| 49 | 70.0 | 15.0 | 15.0 | 19.4 |
| 50 | 65.0 | 15.0 | 20.0 | 22.5 |

EXAMPLES 51-53

These examples show the improvement of extrusion sag time as the level of a MRM polymer of the present invention is increased in an unmodified, linear polycarbonate (PC). The MRM polymer was made using a two-stage redox emulsion polymerization and had a composition of 72.16% MMA/24% BMA/38.4% BA, and a molecular weight of $4.6 \times 10^6$. The extrusion sag time was determined as described above, using an extruder speed of 60 rpm, a barrel temperature of 266° C. and a 1.59-mm die. The results are shown in Table IX, below.

TABLE IX

| Example | Linear PC (%) | Acrylic Polymer (%) | Extrusion Sag Time (sec) |
| --- | --- | --- | --- |
| 51 | 100.0 | 0.0 | 3.3 |
| 52 | 95.0 | 5.0 | 5.2 |

TABLE IX-continued

| Example | Linear PC (%) | Acrylic Polymer (%) | Extrusion Sag Time (sec) |
|---|---|---|---|
| 53 | 90.0 | 10.0 | 7.1 |

EXAMPLES 54–59

These examples illustrate the effect on extrusion sag time of additional thermoplastic engineering resins when the high-molecular-weight acrylic MRM polymers of the present invention are incorporated in them. In the following table, the resins listed are S/AN, a Poly(styrene-acrylonitrile) resin marketed by Monsanto as Lustran SAN-35; S/MAH, a poly(styrene-maleic anhydride) resin marketed by Arco as Dylark 332; polyarylate, an aromatic polyester resin marketed by Union Carbide as Ardel D-240; PEI, as poly(etherimide) resin marketed by General Electric Company as Ultem 1000; Nylon-6 a poly(caprolactam) marketed as Capron 8202 by Allied Chemical and PBT, a poly(butylene terephthalate) resin having an intrinsic viscosity measured in 60/40 phenol/tetrachloroethane of 1.1 dl/g at 25° C. and marketed by General Electric Company as Valox 315. The acrylic polymers were blended into the thermoplastic resins using a 25-mm Killion single-screw extruder at the indicated barrel temperatures. Extrusion sag time was also measured at the indicated barrel temperatures using a 3.18-mm die and the procedure described above. The results are shown in Table X.

TABLE X

| Example | Acrylic Polymer (1) | $M_w \times 10^6$ | Blend Level (2) | Thermo-Plastic Resin | Barrel Temp (°C.) | Extrusion Sag time (sec) |
|---|---|---|---|---|---|---|
| 54A | A | 4.6 | 10 | S/AN | 360 | 48.2 |
| 54B | — | — | 0 | S/AN | 360 | 22.6 |
| 55A | A | 4.6 | 10 | S/MAH | 425 | 43.5 |
| 55B | — | — | 0 | S/MAH | 425 | 9.9 |
| 56A | A | 4.6 | 10 | Polyarylate | 500 | 10.3 |
| 56B | — | — | 0 | Polyarylate | 500 | 4.7 |
| 57A | A | 4.6 | 10 | PEI | 600 | 11.5 |
| 57B | — | — | 0 | PEI | 600 | 6.5 |
| 58A | B | 4.9 | 5 | Nylon-6 | 450 | 16.8 |
| 58B | — | — | 0 | Nylon-6 | 450 | 8.5 |
| 59A | B | 4.9 | 10 | PBT | 480 | 10.5 |
| 59B | — | — | 0 | PBT | 480 | 5.2 |

[1]Polymer A has the composition 72.16% MMA/24% BMA/3.84% BA
Polymer B has the composition 74% MMA/24% BMA/2% MAA
[2]Level of the acrylic polymer in the resin blend

EXAMPLES 60–61

These examples illustrate the preparation and testing of thermoformable sheet from thermoplastic engineering resins containing the MRM polymers of the present invention.

By a process similar to that of Examples 2–4 blends were prepared having the following compositions:

|  | Example 60 | Example 61 |
|---|---|---|
| PBT of Examples 2–4 | 34.00% | 34.00% |
| PC of Examples 2–4 | 44.75% | 39.75% |
| Impact Modifier of Examples 2–4 | 20.00% | 20.00% |
| Stabilizers | 1.25% | 1.25% |
| MRM Polymer | 0.00% | 5.00% |

The MRM polymer of the present invention was that described in Examples 51–53.

The initial extrusion blending was carried out in a 6/35-cm Prodex extruder; the extruded, pelletized blends were then extruded into sheets and cut to 43-cm by 91-cm tests sheets with a thickness of 1.6 to 2.0 mm. The sheets were hung by one edge in an oven at 175°–190° C. to soften them for thermoforming. The sheets of blend without the MRM polymer were observed to fall to the oven floor if allowed to remain at the thermoforming temperature for longer necessary for handling, while the sheets of blends containing the MRM polymer had sufficient melt strength to hang in place for long periods. Using the Rheometrics Dynamic Spectrometer described above in the oscillating parallel-plate mode, the theology of the two blends was determined at 15% strain during a 260° C.–205° C. temperature sweep; the oscillation frequency was 1 hr. The contributions of elastic (G') and viscous (G'') rheology components to the complex viscosity of the blend are shown in Table XI.

TABLE XI

| Rheology Component | Example 60 | Example 61 |
|---|---|---|
| (G') elastic (dynes/cm$^2$) | $9.6 \times 10^5$ | $1.2 \times 10^6$ |
| (G'') viscous (dynes/cm$^2$) | $8.9 \times 10^5$ | $1.1 \times 10^6$ |
| Complex viscosity (poise) | $1.3 \times 10^6$ | $6.6 \times 10^6$ |

EXAMPLES 62–63

These examples illustrate improvement in sag flow time imparted to a commercial acrylonitrile-butadiene-styrene (ABS) polymer by a high molecular weight MRM polymer. The MRM polymer was made by a two-stage redox process as discussed in Examples 9–18, Process Type III. It had a molecular weight of approximately $4.1 \times 10^6$ and a composition of (MMA/BMA/BA)//(Styrene/BMA/EA), (20/77/3)//(47/50/3), the stages being in a 35//65 ratio. The ABS polymer was supplied by (or obtained from) Borg-Warner as Cycolac HIL-1000; it is believed to be a blend of styrene/acrylonitrile copolymer with a graft polymer of styrene/acrylonitrile onto a poly(butadiene) rubber. Extrusion sag was measured as in Examples 54–59, with a 1.59-mm die and a barrel temperature of 232° C. The extrusion sag time for the control with no MRM additive (Example 62) was 11.3 seconds; for the blend with 10 wt % of the MRM (Example 63), the sag time was 21.4 seconds.

EXAMPLES 64–70

In these examples are shown the improvements in extrusion sag time when acrylic MRM polymers were added to a commercial blend believed to contain poly(phenylene ether) //high impact polystyrene, known as Noryl PX-1222 (General Electric). The MRM polymers were made by the two-stage process similar to those in Example 9. In two cases, a commercial methacrylate-butadiene-styrene 20 polymer, Paraloid KM-653 (Rohm and Haas Company, Philadelphia, Pa.), prepared by the process of U.S. Pat. No. 3,985,704 was utilized. The molecular weight of the soluble methacrylic polymer extracted from this modifier was below 500,000; the remainder of the modifier was highly crosslinked and insoluble in organic solvents. Processing and testing for sag was measured as in Examples 54–59, with a 1.59-mm die at a barrel temperature of 232° C. The results are shown in Table XII.

TABLE XII

| Example | Noryl, parts | KM-653, parts | MRM, parts | Extrusion sag time, seconds |
|---------|--------------|---------------|------------|------------------------------|
| 64 | 500 | — | — | 5.2 |
| 65 | 450 | — | A, 50 | 21.2 |
| 66 | 450 | — | B, 50 | 20.2 |
| 67 | 450 | — | C, 50 | 25.4 |
| 68 | 475 | 25 | — | 5.4 |
| 69 | 475 | — | C, 25 | 15.7 |
| 70 | 450 | 25 | C, 25 | 21.7 |

Modifier A: St/BMA/BA//St/BMA/BA = 20/77/3//47/50/3.
Modifier B: St/BMA/BA//MMA/BMA/BA = 20/77/3//47/50/3.
Modifier C: MMA/BMA/BA//St/BMA/BA = 20/77/3//47/50/3.
The stage ratio in all modifiers was 35//65.

EXAMPLES 71-72

These examples illustrate the ability of a MRM to enhance the melt strength of a resin sufficient to form foam of acceptable cell size and load-bearing strength. A blend of the modifier of Example 27 (10 parts per hundred parts of matrix) with the matrix blend of polycarbonate/poly(butylene terephthalate)/MBS impact modifier of Examples 2-4 was prepared; the blend also contained 1 part of azodicarbonamide, a chemical blowing agent. The blend was processed in a Haake Rheocord mixer at a melt temperature of 247° C. at 60 rpm and extruded through a 6.35-mm die. On exiting the die, the strand (Example 71) foamed to a diameter of 10.4 min. The foamed extrudate had acceptable strength and surface. A control without the MRM processed in a similar manner (Example 72) had poorer strength and surface, and had expanded to a diameter of 8.8 mm.

What is claimed is:

1. A blow-molded article formed from a polymer blend which comprises a thermoplastic engineering resin and blended therewith from about 1 to about 25%, based on the total weight of the blend, of a methacrylic ester polymer of units of one or more copolymerizable vinyl monomers, wherein at least 70% by weight of the units have the formula.

2. The blow-molded article of claim 1 wherein the article is formed by extrusion blow molding.

3. The blow-molded article of claim 1 wherein the article is formed by injection blow molding.

4. The blow-molded article of claim 1 wherein the article is a container.

5. The blow-molded article of claim 1 wherein the article is an automotive bumper.

6. The blow-molded article of claim 1 wherein the article is an automotive body panel.

7. The blow-molded article of claim 1 wherein the article is an architectural wall panel.

8. The blow-molded article of claim 42 wherein the article is formed with an internal foamed structure.

* * * * *

UNITED STATES PATENT AND TRADEMARK OFFICE
CERTIFICATE OF CORRECTION

PATENT NO. : 5,352,500

DATED : October 4, 1994

INVENTOR(S) : Nazir A. Memon

It is certified that error appears in the above-indentified patent and that said Letters Patent is hereby corrected as shown below:

Column 4, Line 38; "FIRM" should read MRM

In the Claims - Column 16, Line 6 should read:

Claim 1. A blow-molded article formed from a polymer blend which comprises a thermoplastic engineering resin and blended therewith from about 1 to about 25%, based on the total weight of the blend, of a methacrylic ester polymer of units of one or more copolymerizable vinyl monomers, wherein at least 70 % by weight of the units have the formula

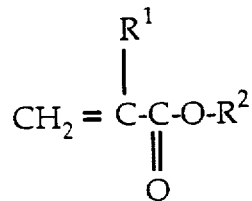

wherein R1 is CH3, and R2 is selected from the group consisting of methyl, ethyl, and n-butyl, and having a minimum weight-average molecular weight of about 1,500,000.

UNITED STATES PATENT AND TRADEMARK OFFICE
CERTIFICATE OF CORRECTION

PATENT NO. : 5,352,500
DATED : October 4, 1994
INVENTOR(S) : Nazir A. Memon

It is certified that error appears in the above-indentified patent and that said Letters Patent is hereby corrected as shown below:

Column 16, Line 25 should read:

Claim 8. The blow-molded article of claim 1 wherein the article is formed with an internal foamed structure.

Signed and Sealed this

Twentieth Day of December, 1994

Attest:

BRUCE LEHMAN

Attesting Officer      Commissioner of Patents and Trademarks